(12) United States Patent
Chen (10) Patent No.: US 9,102,855 B2
(45) Date of Patent: Aug. 11, 2015

(54) REMOVAL OF CRYSTALLINITY IN GUAR BASED MATERIALS AND RELATED METHODS OF HYDRATION AND SUBTERRANEAN APPLICATIONS

(75) Inventor: Yiyan Chen, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 792 days.

(21) Appl. No.: 12/637,795

(22) Filed: Dec. 15, 2009

(65) Prior Publication Data

US 2010/0160188 A1 Jun. 24, 2010

Related U.S. Application Data

(60) Provisional application No. 61/138,804, filed on Dec. 18, 2008.

(51) Int. Cl.
| | |
|---|---|
| *C09K 8/62* | (2006.01) |
| *C09K 8/00* | (2006.01) |
| *C08B 37/00* | (2006.01) |
| *C08L 5/00* | (2006.01) |
| *C08L 71/02* | (2006.01) |
| *C09K 8/68* | (2006.01) |

(52) U.S. Cl.
CPC .............. *C09K 8/00* (2013.01); *C08B 37/0096* (2013.01); *C08L 5/00* (2013.01); *C08L 71/02* (2013.01); *C09K 8/685* (2013.01)

(58) Field of Classification Search
None
See application file for complete search history.

(56) References Cited

U.S. PATENT DOCUMENTS

| | | | |
|---|---|---|---|
| 3,692,676 A | 9/1972 | Culter et al. | |
| 4,031,307 A * | 6/1977 | DeMartino et al. | 536/114 |
| 4,169,945 A * | 10/1979 | DeGuia et al. | 536/114 |
| 4,425,241 A * | 1/1984 | Swanson | 507/110 |
| 4,801,389 A | 1/1989 | Brannon et al. | |
| 5,551,516 A | 9/1996 | Norman et al. | |
| 5,681,796 A | 10/1997 | Nimerick | |
| 6,169,058 B1 | 1/2001 | Le et al. | |
| 6,348,590 B1 * | 2/2002 | Karstens et al. | 536/114 |
| 6,387,853 B1 * | 5/2002 | Dawson et al. | 507/211 |

(Continued)

FOREIGN PATENT DOCUMENTS

| | | |
|---|---|---|
| EP | 473853 A1 | 3/1992 |
| GB | 2370278 | 6/2002 |

(Continued)

OTHER PUBLICATIONS

Hatakeyama, H., Hatakeyama, T. Interaction Between Water and Hydrophilic Polymers—Thermochimica Acta 308 (1998) 3-22. Elsevier Science B.V.

(Continued)

*Primary Examiner* — John J Figueroa
(74) *Attorney, Agent, or Firm* — Jeremy D. Tillman; Rachel E. Greene (57) ABSTRACT

Methods which include hydrating a crystalline polymeric material in a first liquid medium, precipitating the polymeric material to form an amorphous polymeric material, and combining amorphous polymeric material with a second liquid medium to form a treatment fluid. Alternative methods include hydrating a crystalline polymeric material in a first liquid medium, precipitating the polymeric material to form a lower crystalline form of the polymeric material, and combining the lower crystalline form of polymeric material with a second liquid medium to form a treatment fluid.

13 Claims, 5 Drawing Sheets

(56) References Cited

U.S. PATENT DOCUMENTS

| | | |
|---|---|---|
| 6,482,866 B1 | 11/2002 | Dahayanake et al. |
| 6,703,352 B2 | 3/2004 | Dahayanake et al. |
| 6,818,597 B2 * | 11/2004 | Harris .......................... 507/136 |
| 7,195,065 B2 | 3/2007 | Kelly et al. |
| 7,398,826 B2 | 7/2008 | Hoefer et al. |
| 7,703,521 B2 | 4/2010 | Sullivan et al. |
| 7,703,527 B2 | 4/2010 | Sullivan et al. |
| 7,748,452 B2 | 7/2010 | Sullivan et al. |
| 7,790,774 B1 * | 9/2010 | Kinsey et al. .................. 516/31 |
| 8,044,000 B2 | 10/2011 | Sullivan et al. |
| 2002/0052298 A1 * | 5/2002 | Chowdhary et al. .......... 507/209 |
| 2003/0017952 A1 * | 1/2003 | Chowdhary et al. .......... 507/209 |
| 2005/0059558 A1 * | 3/2005 | Blauch et al. ................. 507/203 |
| 2009/0023614 A1 | 1/2009 | Sullivan et al. |
| 2009/0023615 A1 | 1/2009 | Chen et al. |
| 2009/0163387 A1 | 6/2009 | Sullivan et al. |
| 2010/0175881 A1 | 7/2010 | Sullivan et al. |
| 2010/0179076 A1 | 7/2010 | Sullivan et al. |
| 2010/0184630 A1 | 7/2010 | Sullivan et al. |

FOREIGN PATENT DOCUMENTS

| | | |
|---|---|---|
| GB | 2467124 | 7/2010 |
| WO | 2010070599 A1 | 6/2010 |

OTHER PUBLICATIONS

Hatakeyama, T., Naoi, S., Hatakeyama, H. Liquid Crystallization of Glassy Guar Gum with Water—Thermochimica Acta 416 (2004) 121-127. 2003 Elsevier B.V.

Cunha, et al., "Purification of guar gum for biological applications", International Journal of Biological Macro-molecules, vol. 41, 2007, pp. 324-331.

Mark, et al., "Oilfield Applications", Encyclopedia of Polymer Science and Engineering, vol. 10, John Wiley & Sons, Inc., 1987, pp. 328-366.

Wypych, George, "Handbook of Solvents", William Andrew Publishing, New York, 2001, p. 128.

* cited by examiner

REMOVAL OF CRYSTALLINITY IN GUAR BASED MATERIALS AND RELATED METHODS OF HYDRATION AND SUBTERRANEAN APPLICATIONS

RELATED APPLICATIONS

This application is related, and claims the benefit of, U.S. Provisional Patent Application 61/138,804 entitled "REMOVAL OF CRYSTALLINITY IN GUAR MOLECULES AND RELATED METHODS OF HYDRATION & SUBTERRANEAN APPLICATION", filed on Dec. 18, 2008, which is incorporated herein by reference.

BACKGROUND

The statements in this section merely provide background information related to the present disclosure and may not constitute prior art.

Embodiments relate to compositions and methods for treating subterranean formations, in particular, oilfield stimulation compositions and methods using essentially non-crystalline gelling agents.

It is known that guar molecules can be crystallized into several forms of crystals with different amount of water and under different crystallization processes. For example, when producing powdered guar, the guar bean splits are soaked in water to be swollen. The swollen guar splits are grinded to smaller pieces. The swollen guar is softer and allows for easy grinding without much damage to polymer chain. The smaller pieces are then grinded and drying at the same time to even smaller pieces until finally they are powders. Water is gradually driven out of the system as the process continues but is generally not completely removed. Guar based polysaccharides have multiple opportunities to be crystallized into different crystalline form throughout this process. Thus a way to disrupt the crystalline structure is expected to be useful in improving hydration and ultimately, fluids used in the treatment of subterranean formations.

SUMMARY

Embodiments disclosed are related to compositions and methods for treating subterranean formations, in particular, oilfield stimulation compositions and methods using essentially non-crystalline gelling agents.

In a first aspect, disclosed are methods which include hydrating a crystalline polymeric material in a first liquid medium, precipitating the polymeric material to form an amorphous polymeric material, and combining amorphous polymeric material with a second liquid medium to form a treatment fluid.

In another aspect, methods include hydrating a crystalline polymeric material in a first liquid medium, precipitating the polymeric material to form a lower crystalline form of the polymeric material, and combining the lower crystalline form of polymeric material with a second liquid medium to form a treatment fluid.

Other embodiments include methods of treating a formation penetrated by a wellbore which include mixing a crystalline form of guar polymer in a first liquid medium, precipitating the guar polymer to form a second form of guar polymer (selected from at least one of an amorphous form of guar polymer and lower crystalline form of guar polymer), adding the second form amorphous guar polymer to a second liquid medium to form a treatment fluid, and introducing the treatment fluid into the wellbore to treat the subterranean formation.

DESCRIPTION OF SOME ILLUSTRATIVE EMBODIMENTS

At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

To enhance or increase the production of oil and gas hydrocarbons from wells bored into subterranean formations, it has been common practice to pump a viscous fluid at high pressures down in to the well bore to fracture the formation and force the fracturing fluid into those fractures. The fracturing fluid is also used to carry sand or other types of particles, called proppants, to hold the fractures open when the pressure is relieved. The fractures held open by the proppant provide additional paths for the oil or gas to reach the wellbore, which increases production from the well.

Because of the high volumes of fracturing fluids used, it is desirable to thicken the fracturing fluids with very efficient thickeners. Efficient thickeners such as guar gum, and derivatized guar gum, celluloses, etc., are commonly used. Any of these types of hydratable polymers may be used in accordance with the invention. The viscosity of solutions of guar gum and similar thickeners may also be enhanced by crosslinking them with metal containing materials. Thus, metal crosslinked guar gum and derivatized guar gum, are useful as fracturing fluids.

Polysaccharide type hydratable polymers have long been used in the oilfield industry. Hydration of the polymer is a continuing improvement focus in the industry. Faster hydration or easiness of hydration as well as highest viscosity yielding are goals that drive the study of polymer hydration process. When the polysaccharide polymer is acquired from the plant seed, it is of particular interest, as it is low cost to produce and high molecular weight. "Crystallinity" may be associated with the seed growth process and/or powdering manufacturing process that may lead to the difficulty of polymer hydration. Although crystallinity is not an exactly accurate word to describe the guar structure, it is still used here for convenience. After all, it is an ordered arrangement of the polysaccharide chains in a certain domain, which resembles the crystallinity concept. This disclosure discusses the relationship of the crystallinity to hydration and possible ways to remove the crystallinity of the hydratable polymer.

Metal (such as chromium, hafnium, aluminum, zirconium, titanium, antimony) complexes are commonly used in the oilfield industry as crosslinkers for water soluble polymer containing wellbore fluids. Ligands such as various alkanolamine derivatives (eg trietanolamine, bicine), or alpha hydroxy carboxylates (such as lactate) are common metallic complexes in the field. These complexes are moderately stable in aqueous media at the pH and temperature conditions the fluids are pumped downhole.

When crosslinkers are used in wellbore treatment fluids for subterranean applications, in some embodiments, a hydratable polymer is placed into and hydrated in a mixwater, which can contain other ingredients such as surfactants, salts, buffers, and temperature stabilizers. A crosslinker solution is added prior to the fluid mixture being pumped into the well. Applications such as hydraulic fracturing, gravel packing, sand control and conformance control use such crosslinked fluid systems. The liquid crosslinker additive concentrations typically range from about 0.01% to 1.0% by volume, based upon total fluid volume. Alternatively, the fluids can be used without a crosslinker for the same applications, depending upon the particular needs.

The fluids may be for hydraulically fracturing a subterranean formation. Techniques for hydraulically fracturing a subterranean formation are known to persons of ordinary skill in the art, and involve pumping a fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications", Encyclopedia of Polymer Science and Engineering, vol. 10, pp. 328-366 (John Wiley & Sons, Inc. New York, N.Y., 1987) and references cited therein, the disclosures of which are incorporated herein by reference.

In various embodiments, hydraulic fracturing involves pumping a proppant-free viscous fluid, or pad—usually water with some fluid additives to generate high viscosity—into a well faster than the fluid can escape into the formation so that the pressure rises and the rock breaks, creating artificial fractures and/or enlarging existing fractures. Then, proppant particles are added to the fluid to form slurry that is pumped into the fracture to prevent it from closing when the pumping pressure is released. In the fracturing treatment, fluids of the present invention are used in the pad treatment, the proppant stage, or both.

The hydratable polymer is a high molecular weight water-soluble polysaccharide containing cis-hydroxyl and/or carboxylate groups that can form a complex with the released metal. Without limitation, useful polysaccharides for the practice of this invention have molecular weights in the range of about 200,000 to about 3,000,000.

Polysaccharides having adjacent cis-hydroxyl groups for the purposes of the invention include such polysaccharides as the galactomannans. The term galactomannans refers in various aspects to natural occurring polysaccharides derived from various endosperms of seeds. They are primarily composed of D-mannose and D-galactose units. They generally have similar physical properties, such as being soluble in water to form thick highly viscous solutions which usually can be gelled (crosslinked) by the addition of such inorganic salts as borax. Examples of some plants producing seeds containing galactomannan gums include Tara, Huizache, locust bean, Pola verde, Flame tree, guar bean plant, Honey locust, Lucerne, Ky. coffee bean, Japanese pagoda tree, Indigo, Jenna, Rattlehox, Clover, Fenergruk seeds and soy bean hulls. The gum is provided in a convenient particulate form. Of these polysaccharides, guar and its derivatives are preferred. These include guar gum, carboxymethylguar, hydroxyethylguar, carboxymethylhydroxyethylguar, hydroxypropylguar (HPG), carboxymethylhydroxypropylguar, guar hydroxyalkyltriammonium chloride, and combinations thereof. As a galactomannan, guar gum is a branched copolymer containing a mannose backbone with galactose branches.

The hydratable polymer may be present at any suitable concentration. In various embodiments hereof, the hydratable polymer can be present in an amount of from about 10 to less than about 60 pounds per thousand gallons of liquid phase, or from about 15 to less than about 40 pounds per thousand gallons, from about 15 to about 35 pounds per thousand gallons, 15 to about 25 pounds per thousand gallons, or even from about 17 to about 22 pounds per thousand gallons. Generally, the hydratable polymer can be present in an amount of from about 10 to less than about 50 pounds per thousand gallons of liquid phase, with a lower limit of polymer being no less than about 10, 11, 12, 13, 14, 15, 16, 17, 18, or 19 pounds per thousand gallons of the liquid phase, and the upper limited being less than about 50 pounds per thousand gallons, no greater than 59, 54, 49, 44, 39, 34, 30, 29, 28, 27, 26, 25, 24, 23, 22, 21, or 20 pounds per thousand gallons of the liquid phase. In some embodiments, the polymers can be present in an amount of about 20 pounds per thousand gallons. Fluids incorporating a hydratable polymer may have any suitable viscosity, preferably a viscosity value of about 50 mPa-s or greater at a shear rate of about 100 s-1 at treatment temperature, more preferably about 75 mPa-s or greater at a shear rate of about 100 s-1, and even more preferably about 100 mPa-s or greater, in some instances.

Upon hydrolysis, galactomannans may yield the two simple sugars, mannose, and galactose. Analyses have indicated that such polysaccharides are long chain polymers of D-mannopyranose units linked at the β-1,4 position which have D-galactopyranose units located as side chains on the molecule. The D-galactopyranose units are connected to the $CB_{6B}$ atoms of the D-mannose units that make up the main structural framework. The ratio of D-galactose to D-mannose in the galactomannans generally varies from about 1:1.2 to about 1:2, depending upon the particular vegetable source from which the material is derived. In all cases, however, the mannose residues have cis-hydroxyl groups at the $CB_{2B}$ and $CB_{3B}$ positions, accounting for the crosslinking reactions obtained with the galactomannans and making them useful for the purposes of the invention. As noted, guar gum is a particularly preferred galactomannan.

Non-limiting examples of hydroxyl ion releasing agent include any soluble or partially soluble hydroxide or carbonate that provides the desirable pH value in the fracturing fluid to promote borate ion formation and crosslinking with the polysaccharide and polyol. The alkali metal hydroxides, e.g., sodium hydroxide, and carbonates are preferred. Other acceptable materials are $Ca(OH)B_{2B}$, $Mg(OH)B_{2B}$, $Bi(OH)B_{3B}$, $Co(OH)B_{2B}$, $Pb(OH)B_{2B}$, $Ni(OH)B_{2B}$, $Ba(OH)B_{2B}$ and $Sr(OH)B_{2B}$. At temperatures above about 175° F., potassium fluoride (KF) is used to prevent the precipitation of MgO when $Mg(OH)B_{2B}$ is used as a base, i.e., hydroxyl ion releasing agent. The amount of the hydroxyl ion source to provide is that which is sufficient to yield a pH value in the fracturing fluid of at least about 8.0, preferably at least 8.5, preferably at least about 9.5, and more preferably between about 9.5 and about 12.

A buffering agent may be employed to buffer the fracturing fluid, i.e., moderate amounts of either a strong base or acid may be added without causing any large change in pH value of the fracturing fluid. In various embodiments, the buffering agent is a combination of a weak acid and a salt of the weak acid; an acid salt with a normal salt; or two acid salts. Examples of suitable buffering agents are $NaHB_{2B}POB_{4B}$—$NaB_{2B}HPOB_{4B}$; sodium carbonate-sodium bicarbonate; and sodium bicarbonate, or other like agents. By employing a buffering agent instead of merely a hydroxyl ion producing material, a fracturing fluid is provided which is more stable to a wide range of pH values found in local water supplies and to the influence of acidic materials located in formations and the like. In an exemplary embodiment, the pH control agent is varied between about 0.6 percent and about 40 percent by weight of the polysaccharide employed.

By non-limiting example, polymer is provided at levels of about 10-60 pounds/1000 gallons of water (about 0.12-0.72% by wt.). For such concentrations of guar gum, e.g. 10-60 pounds/1000 gal, it has been found that the hydration rate is independent of the concentration. Use of lower levels tends to lead to development of insufficient viscosity, while higher concentrations tend to waste material. Where those disadvantages are avoided, higher and lower concentrations are useful.

The hydratable polymer is generally stable in the presence of dissolved salts. Accordingly, ordinary tap water, brines, and the like can be used to prepare the polymer solution.

Some fluids according to the invention may also include a surfactant. Any surfactant for which its ability to aid the dispersion and/or stabilization of the gas component into the base fluid to form an energized fluid is readily apparent to those skilled in the art may be used. Viscoelastic surfactants, such as those described in U.S. Pat. No. 6,703,352 (Dahayanake et al.) and U.S. Pat. No. 6,482,866 (Dahayanake et al.), both incorporated herein by reference, are also suitable for use in fluids of the invention. In some embodiments of the invention, the surfactant is an ionic surfactant. Examples of suitable ionic surfactants include, but are not limited to, anionic surfactants such as alkyl carboxylates, alkyl ether carboxylates, alkyl sulfates, alkyl ether sulfates, alkyl sulfonates, α-olefin sulfonates, alkyl ether sulfates, alkyl phosphates and alkyl ether phosphates. Examples of suitable ionic surfactants also include, but are not limited to, cationic surfactants such as alkyl amines, alkyl diamines, alkyl ether amines, alkyl quaternary ammonium, dialkyl quaternary ammonium and ester quaternary ammonium compounds. Examples of suitable ionic surfactants also include, but are not limited to, surfactants that are usually regarded as zwitterionic surfactants and in some cases as amphoteric surfactants such as alkyl betaines, alkyl amido betaines, alkyl imidazolines, alkyl amine oxides and alkyl quaternary ammonium carboxylates. The amphoteric surfactant is a class of surfactant that has both a positively charged moiety and a negatively charged moiety over a certain pH range (e.g. typically slightly acidic), only a negatively charged moiety over a certain pH range (e.g. typically slightly alkaline) and only a positively charged moiety at a different pH range (e.g. typically moderately acidic), while a zwitterionic surfactant has a permanently positively charged moiety in the molecule regardless of pH and a negatively charged moiety at alkaline pH. In some embodiments of the invention, the surfactant is a cationic, zwitterionic or amphoteric surfactant containing and amine group or a quaternary ammonium group in its chemical structure ("amine functional surfactant"). A particularly useful surfactant is the amphoteric alkyl amine contained in the surfactant solution Aquat 944® (available from Baker Petrolite of 12645 W. Airport Blvd, Sugar Land, Tex. 77478 USA). In other embodiments of the invention, the surfactant is a blend of two or more of the surfactants described above, or a blend of any of the surfactant or surfactants described above with one or more nonionic surfactants. Examples of suitable nonionic surfactants include, but are not limited to, alkyl alcohol ethoxylates, alkyl phenol ethoxylates, alkyl acid ethoxylates, alkyl amine ethoxylates, sorbitan alkanoates and ethoxylated sorbitan alkanoates. Any effective amount of surfactant or blend of surfactants may be used in aqueous energized fluids of the invention. Preferably the fluids incorporate the surfactant or blend of surfactants in an amount of about 0.02 wt % to about 5 wt % of total liquid phase weight, and more preferably from about 0.05 wt % to about 2 wt % of total liquid phase weight. One particularly useful surfactant is sodium tridecyl ether sulfate.

Friction reducers may also be incorporated into fluids of the invention. Any friction reducer may be used. Also, polymers such as polyacrylamide, polyisobutyl methacrylate, polymethyl methacrylate and polyisobutylene as well as water-soluble friction reducers such as guar gum, guar gum derivatives, polyacrylamide, and polyethylene oxide may be used. Commercial drag reducing chemicals such as those sold by Conoco Inc. under the trademark "CDR" as described in U.S. Pat. No. 3,692,676 (Culter et al.) or drag reducers such as those sold by Chemlink designated under the trademarks "FLO 1003, 1004, 1005 & 1008" have also been found to be effective. These polymeric species added as friction reducers or viscosity index improvers may also act as excellent fluid loss additives reducing or even eliminating the need for conventional fluid loss additives. Latex resins or polymer emulsions may be incorporated as fluid loss additives. Shear recovery agents may also be used in embodiments of the invention.

Fluids may also comprise a breaker. The purpose of this component is to "break" or diminish the viscosity of the fluid so that this fluid is more easily recovered from the formation during cleanup. With regard to breaking down viscosity, oxidizers, enzymes, or acids may be used. Breakers reduce the polymer's molecular weight by the action of an acid, an oxidizer, an enzyme, or some combination of these on the polymer itself. In the case of borate-crosslinked gels, increasing the pH and therefore increasing the effective concentration of the active crosslinker, the borate anion, reversibly create the borate crosslinks Lowering the pH can just as easily eliminate the borate/polymer bonds. At a high pH above 8, the borate ion exists and is available to crosslink and cause gelling. At lower pH, the borate is tied up by hydrogen and is not available for crosslinking, thus gelation caused by borate ion is reversible.

Embodiments may also include proppant particles that are substantially insoluble in the fluids of the formation. Proppant particles carried by the treatment fluid remain in the fracture created, thus propping open the fracture when the fracturing pressure is released and the well is put into production. Suitable proppant materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh in size. With synthetic proppants, mesh sizes about 8 or greater may be used. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference.

The concentration of proppant in the fluid can be any concentration known in the art, and will preferably be in the range of from about 0.03 to about 3 kilograms of proppant added per liter of liquid phase. Also, any of the proppant particles can further be coated with a resin to potentially improve the strength, clustering ability, and flow back properties of the proppant.

The aqueous medium of the present invention may be water or brine. In those embodiments of the invention where the aqueous medium is a brine, the brine is water comprising an inorganic salt or organic salt. Preferred inorganic salts include alkali metal halides, more preferably potassium chloride. The carrier brine phase may also comprise an organic salt more preferably sodium or potassium formate. Preferred inorganic divalent salts include calcium halides, more preferably calcium chloride or calcium bromide. Sodium bromide, potassium bromide, or cesium bromide may also be used. The salt is chosen for compatibility reasons i.e. where the reservoir drilling fluid used a particular brine phase and the completion/clean up fluid brine phase is chosen to have the same brine phase.

A fiber component may be included in the fluids to achieve a variety of properties including improving particle suspension, and particle transport capabilities, and gas phase stability. Fibers used may be hydrophilic or hydrophobic in nature, but hydrophilic fibers are preferred. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof. Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be include at concentrations from about 1 to about 15 grams per liter of the liquid phase of the fluid, preferably the concentration of fibers are from about 2 to about 12 grams per liter of liquid, and more preferably from about 2 to about 10 grams per liter of liquid.

Aqueous fluid embodiments of the invention may also comprise an organoamino compound. Examples of suitable organoamino compounds include, but are not necessarily limited to, tetraethylenepentamine, triethylenetetramine, pentaethylenehexamine, triethanolamine, and the like, or any mixtures thereof. When organoamino compounds are used in fluids of the invention, they are incorporated at an amount from about 0.01 wt % to about 2.0 wt % based on total liquid phase weight. Preferably, when used, the organoamino compound is incorporated at an amount from about 0.05 wt % to about 1.0 wt % based on total liquid phase weight. A particularly useful organoamino compound is tetraethylenepentamine.

Although various embodiments have been described with respect to enabling disclosures, it is to be understood the invention is not limited to the disclosed embodiments. Variations and modifications that would occur to one of skill in the art upon reading the specification are also within the scope of the invention, which is defined in the appended claims.

To help identify the best approach towards improving polymer hydration, fundamentals of hydration were explored with several representative polymers including 1) guar type of natural seed polymer, 2) Xanthan type of bacteria generated polymer, and 3) CMHPG type of charged guar derivatives. Their hydration video clips are given in Appendix.

Example 1

Among all polymers examined, guar was found to be the most difficult one to hydrate. Under microscope, as displayed in FIG. 1, guar gum exhibits crystallinity as shown in (A), at the bottom half. Even upon contact with water, the crystalline structure is not easily disrupted, as shown in (A) top half, where water has immersed the guar particles, but the pieces of guar particles are visible. The guar particles will keep its domain without being completely dissolved in water.

Figure 1:
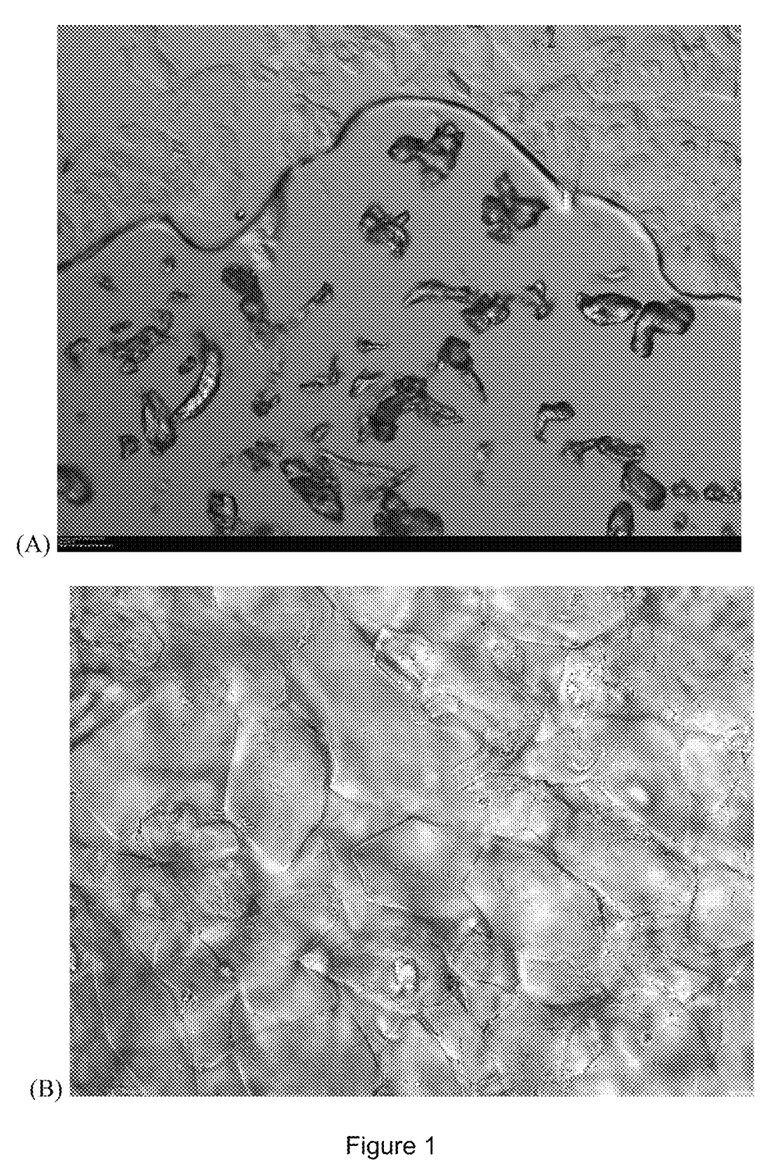
FIG. 1 is a micrograph illustration of guar gum crystallinity and appearance in an emulsion.

In FIGS. 1, A and B are images of guar gum upon contact with water under microscope. (A) guar powder dry (bottom) and partially exposed to water. (B) Guar in water in water emulsion with PEG8000, polyethylene glycol.

Figure 2:
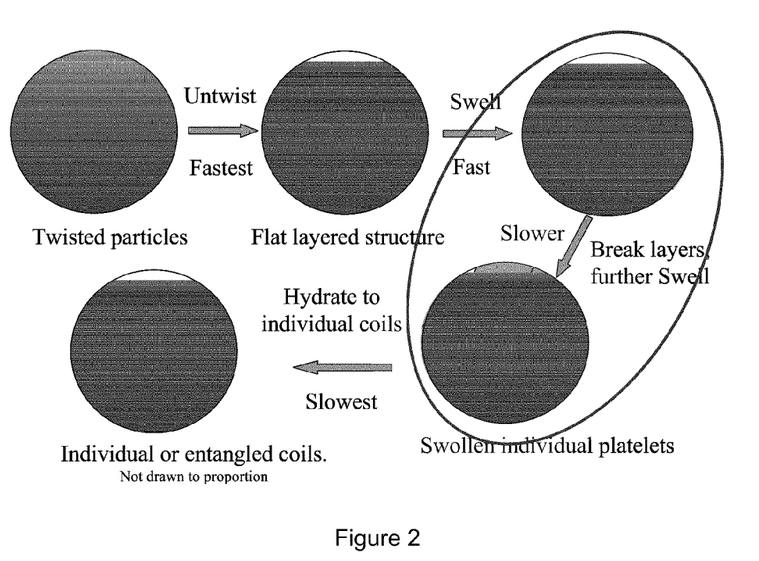
FIG. 2 is a schematic representation of a guar hydration process.

Closer examination of guar under microscope revealed that its hydration starts with fast untwisting of original twisted guar particles into flat layered structure. The layers then quickly swells followed by a slow dissociation of layers or sheets, after which it comes the slowest step for the polymer to extend to individual or entangled coils. A schematic of this process is depicted in FIG. 2.

Contrary to guar, bacteria excreted polymers such as Xanthan and Diutan gums quickly disintegrate in water into smaller pieces leading to nearly instantaneous hydration. The hydration of CMHPG type of charged guar derivatives is not as fast as diutan, but much more improved over guar. The CMHPG particles appear essentially completely dissolved after swelling is over, presumably due to the charge repulsion from the polymer backbone. Due to the charged nature of these polymers, unlike with guar gum, chemical additives can be introduced to adjust the hydration rate through interactions with the charged centers.

The microscopic observations suggest that the relatively slow hydration of guar may be affected by densely packed crystalline structures. The crystalline structures can be created by the seed growth in nature, or by the powdering manufacture process in a powdering plant. When growing a seed, nature usually maximize the energy stored in the seed by orderly pack the molecules in the seed. When the guar seed is process in the manufacturer to give powdery material in order to maximize water contact in hydration, the guar material is being process with multiple steps of grinding and drying. It is known that guar molecules can be crystallized into several forms of crystals with different amount of water and under different crystallization processes. For example, when producing powdered guar, the guar bean splits are soaked in water to be swollen. The swollen guar splits are grinded to smaller pieces. The swollen guar is softer and allows for easy grinding without much damage to polymer chain. The smaller pieces are then grinded and drying at the same time to even smaller pieces until finally they are powders. Water is gradually driven out of the system as the process continues but is never completely removed. As indicated in the reference, guar polysaccharides have multiple opportunities to be crystallized into different crystalline form throughout this process. See references: Tatsuko Hatakeyama, Sunao Naoi, Hyoe Hatakeyama, Liquid Crystallization of Glassy Guar Gum with Water, Thermochimica Acta, 416 (2004), 121-127; and, Hyoe Hatakeyama, Tatsuko Hatakeyama, Interaction between water and hydrophilic polymers, Thermochimica Acta, 308 (1998), 3-22, both of which are incorporated herein in their entirety, by reference thereto. Thus a way to disrupt the crystalline structure is expected to be useful in improving hydration.

Some possible ways to disrupt guar type of polymer crystallinity include, but are not limited to: dissolving the guar and re-crystallize it in a different lower crystalline form; heating to "melt" the crystal; introducing plasticizer to lower the crystallinity and lowering the "melting point" (order-disorder transition temperature); genetically modify the guar seed growth process; or even modifying the manufacture process to avoid any opportunity for the polysaccharide guar to be crystallize, such as flash cooling the swollen splits and process in low temperature, or, flash dry the product with vacuum, adding materials (such as plasticizer) to disrupt crystal forming in cooling and/or drying of the guar powders.

Figure 3:
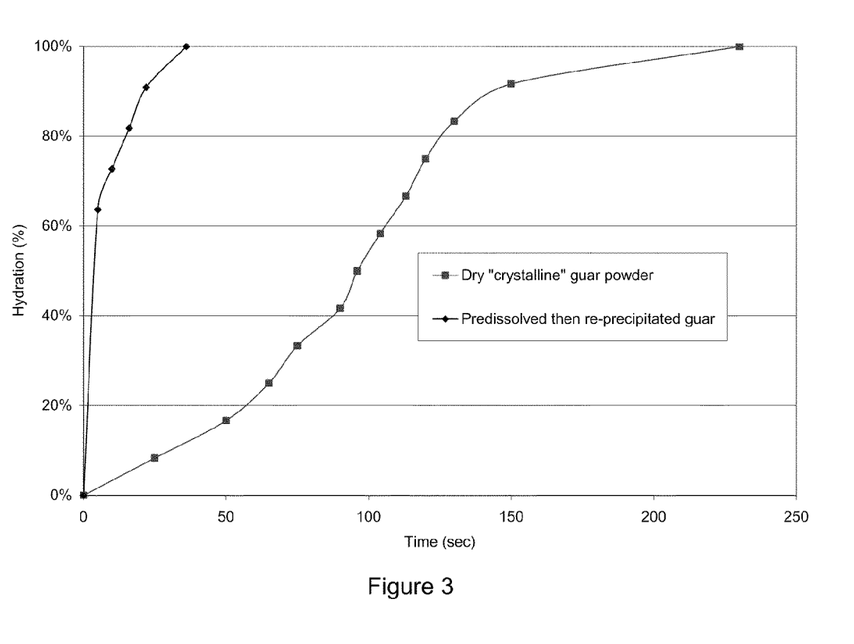
FIG. 3 is a hydration curve of re-precipitated guar powder compared with dry crystalline guar.

Dissolving guar in solution may essentially and/or effectively eliminate crystallinity. Re-crystallization and/or precipitation in a non-solvent, may in some instances, provide low crystalline amorphous guar particles. As an example, to a 1% by weight guar aqueous solution in water, 4% by weight PEG 8000 was added to precipitate the guar from the solution. This precipitate was not crystalline and hydrated rapidly when mixed with water. As shown in FIG. 3, the hydration curve of this re-precipitated guar powder is compared to the hydration curve of the dry crystalline guar. It can easily be seen that the guar with removed crystallinity can hydrate significantly faster than that of the predominately crystalline guar. Again, in FIG. 3, hydration comparison of guar in crystalline phase versus guar in amorphous phase obtained from re-precipitation of a guar solution by PEG 8000, polyethylene glycol, and the total guar content in these hydration tests is 0.5% by weight.

Figure 4:
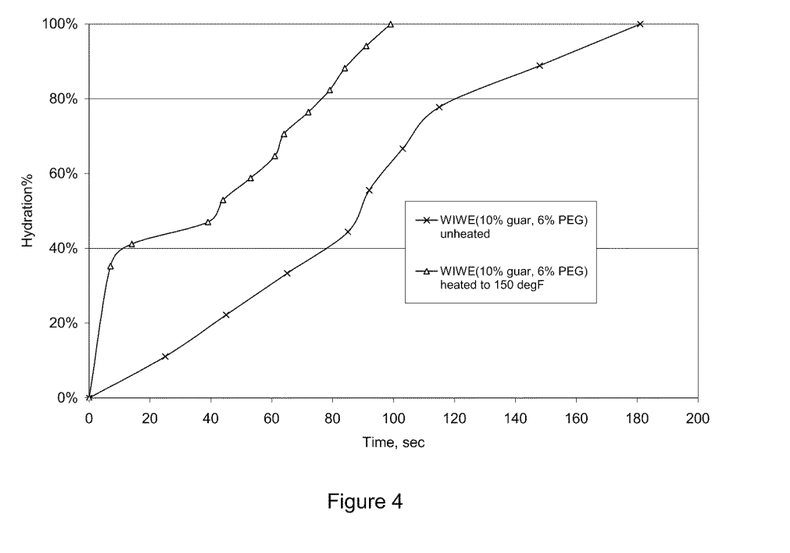
FIG. 4 is a comparison of heated and unheated WIWE hydration rate.

Introducing plasticizer can be done in many ways and plasticized guar can be heated to disrupt crystallinity. For example, allowing the guar to partially hydrate is a method to introduce water into the polymer matrix, which helps the polymer chain to have some freedom to move and thus lowers the melting point. Controlled swelling by water can also happen. For example, using water in water emulsion (WIWE) technology, or like phase emulsions, such as those described in Applicants U.S. Pat. No. 8,044,000 (filed as U.S. application Ser. No. 12/166,774), incorporated herein by reference in its entirety, it may be possible swell the guar plates to a certain size that is approximately 4 times the volume of the un-swollen guar particles, as shown in FIG. 1, B. Once water is in the swollen guar particle, heat can be applied to the sample and effectively diminish the crystallinity. An example is shown in FIG. 4. A WIWE sample with 10% by weight guar, 6% by weight PEG-8000 and 84% by weight water is prepared. Hydration test with a total of 0.5 wt % of guar from this package is run to figure out the hydration rate. The sample was then heated to 150 deg F. under constant stiffing. The heat processed sample is used to perform a hydration test under the same condition. As shown in FIG. 4, the hydration rate of the heat treated WIWE gives about 25% faster hydration compared to the untreated sample.

In another example, a WIWE was frozen at −30 deg F. to induce the water in the swollen guar platelets to turn into ice, and with the expansion from water turning to ice, to crack the guar platelets. Hydration rate differences were not observed.

Figure 5:
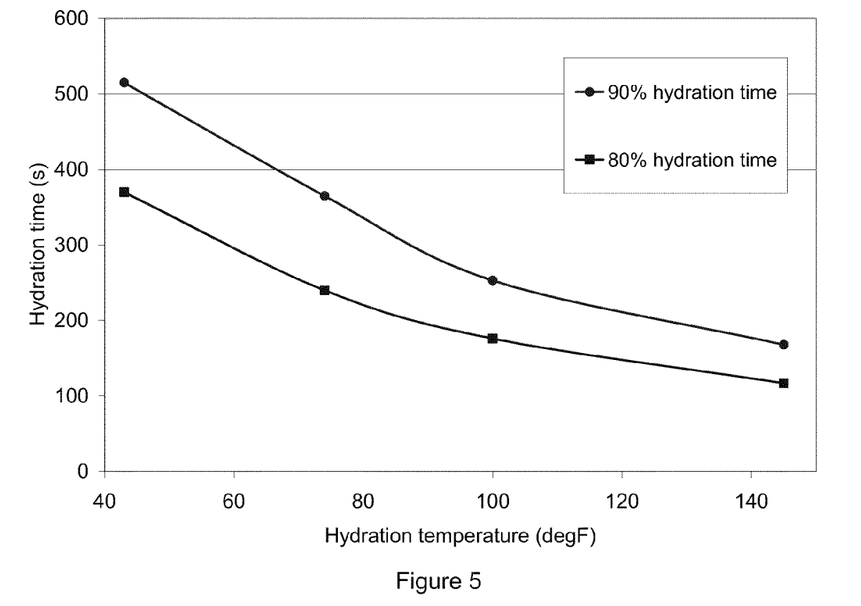
FIG. 5 shows the 80% and 90% hydration times as a function of mix water temperature during a hydration test with an overhead impeller stirring at 1000 rpm.

Heating the hydration water can significantly improve the hydration rate. Although the hotter water temperature contributed to the disruption of the guar crystallinity, it is more likely the hydration rate improvement is mainly due to improved diffusion of water into the guar particles. FIG. 5 shows the 80% and 90% hydration times as a function of mix water temperature during a hydration test with an overhead impeller stirring at 1000 rpm. Increasing the mix water temperature significantly drops the hydration time.

Water or other plasticizer may also be introduced by exposing the guar particles to an atmosphere of a liquid plasticizer at ambient of elevated temperature over time. Treating (such as co-grinding) the guar with certain types of salt or surfactant in some cases can also lead to plasticizing the guar material.

Heat can be introduced by, but not limited to, direct heat exchange, radiation, microwave oven heating, mechanical shearing, heat of dissolution and/or heat of neutralization.

Also, the guar crop growth may be genetically optimized to achieve high production as well as high molecular weight. This may be achievable from that end. If these can be grown from somewhat defective seeds, where the polysaccharide chains are not packed closely, less crystalline material may be realized.

While some aspects have been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary

I claim:

1. A method of treating a subterranean formation, the method comprising:
dissolving a crystalline guar in a first liquid medium;
precipitating the crystalline guar from the first liquid medium to form an amorphous guar;
adding the amorphous guar to a second liquid medium to form a treatment fluid, and
introducing the treatment fluid into a wellbore of the subterranean formation.

2. The method of claim 1 wherein the first and second liquid mediums are aqueous liquid mediums.

3. The method of claim 1 wherein the treatment is fracturing a subterranean formation.

4. The method of claim 1 further comprising heating the crystalline guar.

5. The method of claim 1 further comprising adding a plasticizer to the combination comprising the crystalline guar and the first liquid medium.

6. The method of claim 1 wherein the guar is genetically modified guar.

7. The method of claim 1 further comprising at least one of flash cooling swollen guar splits and processing in low temperature, flash drying guar with vacuum, and adding a plasticizer to disrupt crystal formation in cooling and/or drying of the guar.

8. The method of claim 1 wherein the combination comprising the amorphous guar and the second liquid medium are used to form an emulsion based treatment fluid.

9. The method of claim 1 wherein in the dissolving of the crystalline guar in a first liquid medium, the crystalline guar particles increase in volume by a factor of about four over the period of dissolution.

10. The method of claim 9 wherein heat is applied during the dissolving step to further diminish guar crystallinity.

11. The method of claim 9 wherein heat is introduced by at least one of direct heat exchange, radiation, microwave, mechanical shearing, heat of dissolution and heat of neutralization.

12. The method of claim 1, wherein the precipitating further comprises adding a material to precipitate the amorphous guar.

13. The method of claim 12, wherein the added material is polyethylene glycol.

* * * * *